Figure 1:
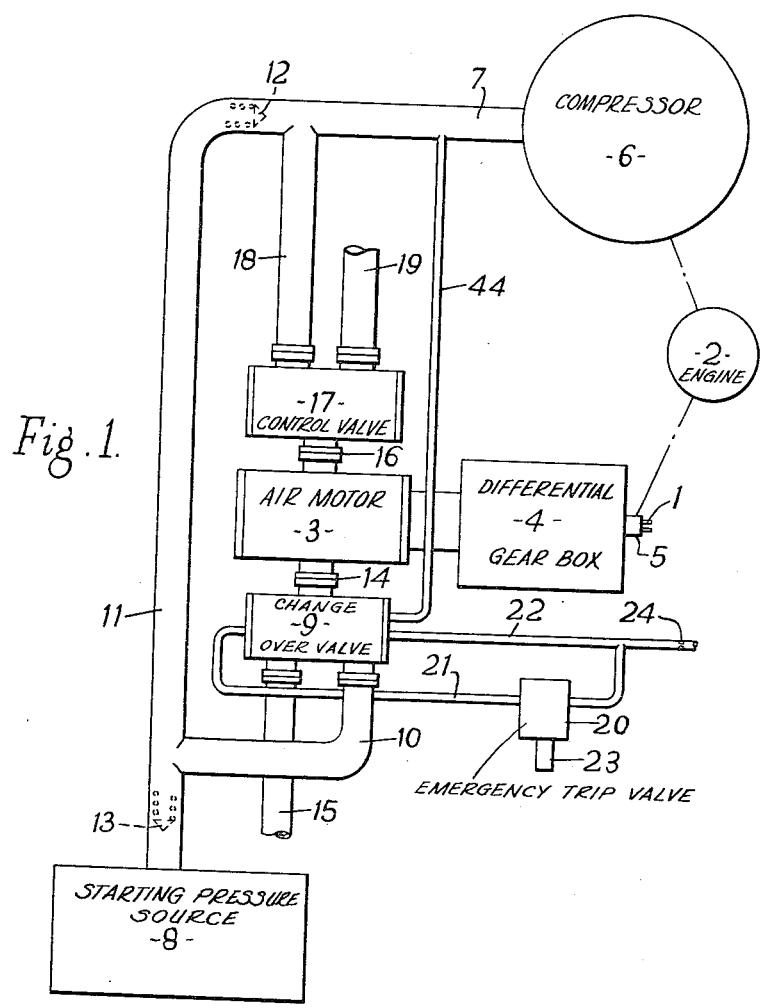

United States Patent Office 3,088,277
Patented May 7, 1963

3,088,277
CONTROL OF COMPOSITE MECHANICAL DRIVES
Norman Frederick North, North Romford, and Peter Bruno Kahn, Loughton, England, assignors to The Plessey Company Limited, London, England, a British company
Filed Mar. 7, 1961, Ser. No. 94,084
4 Claims. (Cl. 60—39.14)

This invention relates to composite mechanical drives and while not strictly limited thereto, it has been developed with a particular view to the composite mechanical drives described in our co-pending U.S.A. application No. 38,671 hereinafter called the main patent. It has for an object to provide an improved valve device adapted to effect automatically the change-over of one of the air motor connections described in the said co-pending application to connect it to a supply of pressure medium (starting pressure supply) when the air motor is to drive the engine and to cut off from such supply and connect it to a vent from which it was disconnected in the former case, when the engine is working above a predetermined speed. More generally speaking the invention relates to a change-over valve suitable for use with a constant speed drive of the kind in which a reversible fluid-pressure motor is utilized in conjunction with a differential gear to supplement the speed which is imparted to an element to be driven at constant speed and hereinafter called constant-speed element from an engine operating at variable speed when the speed thus imparted is below the desired constant speed and to be driven by the engine via the differential gear in the opposite direction at a speed so controlled as to reduce the speed imparted to the constant-speed element by the engine to the desired constant speed when the speed thus imparted is in excess of the said desired speed, and in which means are also provided for power-driving the fluid-pressure motor in the opposite direction under certain conditions of operation, for example for starting the engine, in which case fluid pressure from a starting-pressure source must be fed to that motor connection which during constant-speed running is connected to the atmosphere, and it is an object of the invention to provide an improved valve device adapted to effect this change-over automatically. With this object in view the present invention provides a change-over valve which is pneumatically operable under the control on the one hand of the pressure supplied from the starting-pressure source and on the other hand of the pressure supplied by a compressor driven by the engine.

A constant-speed drive of the kind specified and including a change-over valve which is pneumatically operable under the control on the one hand of the pressure supplied from the starting-pressure source and on the other hand of the pressure supplied by a compressor driven by the engine for automatically connecting one of the two sides of the air motor to the atmosphere or to a starter-pressure source according to the operating conditions constitutes another aspect of the invention.

Preferably means are included superseding the control by the said pressures and causing the air motor to be cut off from both the vent and the starting pressure supply irrespective of the compressor pressure in response to the operation of an overspeed trip valve, when the speed of the air motor or of some other element exceeds a predetermined maximum value.

Preferably the change-over valve is actuated by two piston elements, which for convenience may be integral with the valve element, one of these elements tending to move the valve to the starting position in which pressure from the starting pressure source is admitted to the motor connection, and the other element having a greater area than the former and urging the valve in the opposite direction, towards the position in which the starting pressure source is cut off from the air motor and the air motor is connected to an atmospheric vent, and passages are provided in the valve housing, one of which allows pressure from the starting supply to communicate with little restriction with the chamber acting on the smaller one of the two piston elements, while a more restricted passage admits pressure from the auxiliary supply to the chamber acting upon the larger piston element, and a further restricted passage connects the last-mentioned chamber with an output for example a "bleed," of a compressor driven by the engine. The last-mentioned connection is likewise restricted, so that a pressure intermediate between the pressure of the starting pressure supply and the pressure from the said compressor output will be established in the chamber acting upon the larger one of the two piston elements. With this arrangement when the engine is stationary and therefore the pressure at the compressor outlet is substantially equal to atmospheric pressure, the full pressure of the pressure supply acting upon the smaller piston area will overcome the force produced by the intermediate pressure acting upon the larger piston area and move the valve to the starting position in which pressure from the starting supply is admitted to the air motor for starting the engine. When the "decoupling" speed of the starter is reached, the pressure at the compressor outlet has risen sufficiently to raise the intermediate pressure in the chamber acting upon the larger piston area to overcome the action of the full starting supply pressure acting upon the smaller piston area, and as a result the slide valve will move so as to cut off the admission of pressure from the starting supply to the air motor connection and then, upon further movement, to connect the air motor outlet to the atmospheric vent.

It is preferred to arrange in addition for a restricted atmospheric vent from the chamber acting upon the larger piston area to be opened when the slide valve has moved from the starting position to a position in which the admission of the starting air is cut off but the air motor is not yet connected to the atmospheric vent. In this case, when the said restricted vent is uncovered by the slide valve, the movement of the latter is halted until the speed of the engine has reached the lower limit of its normal working range and, as a result, the bleed air pressure has risen sufficiently for the admission of compressor air through the restricted aperture to make up for loss of pressure through atmospheric bleed, thus allowing the slide valve to continue its movement to the normal working position, in which the air motor outlet is connected to the atmospheric vent, thus allowing the air motor to run in the opposite direction to that used for starting the engine, and thus to supplement the engine speed in order to maintain a constant speed of an alternator or the like as described in the main patent. To provide an overspeed trip, an atmospheric vent, which is opened by an overspeed trip valve, is preferably connected to two ports controlled by the slide valve, of which one port communicates with the chamber acting on the smaller-area piston and is uncovered when the valve is between the neutral and starting position while the other port communicates with the chamber acting on the larger piston and is uncovered when the valve is between the neutral and normal running positions. Conveniently the first-mentioned port is also utilised for connection to the restricted atmospheric bleed that delays the further valve movement from the neutral on blanking position to the normal running position after the decoupling speed has been reached.

Figure 2:
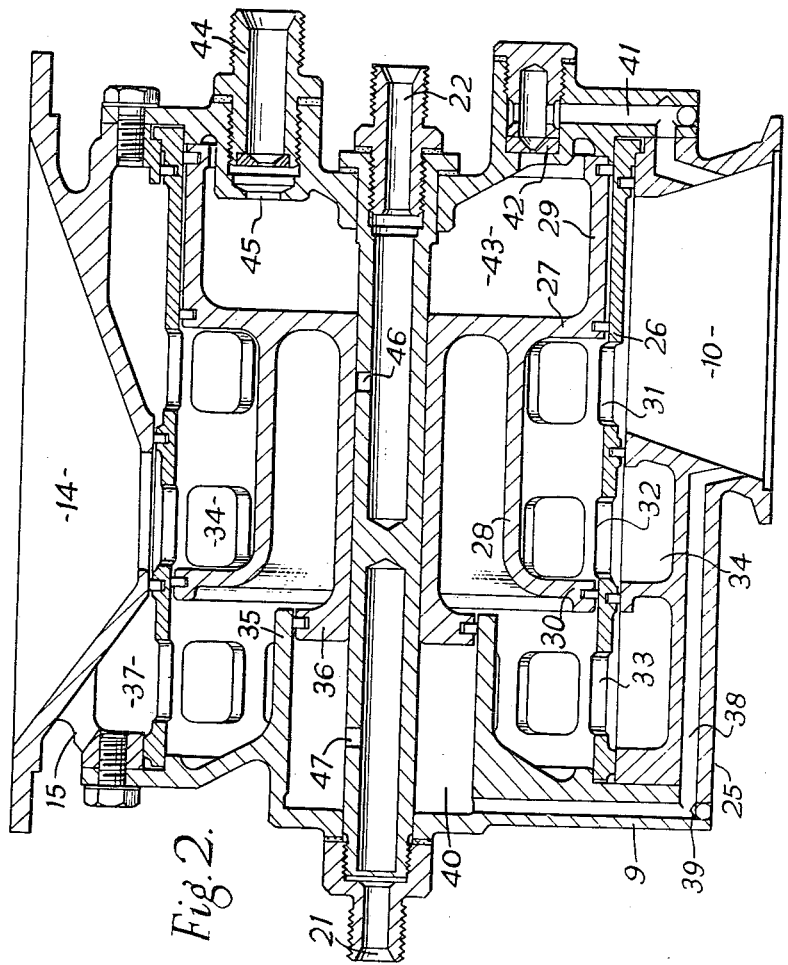

One form of valve device according to the invention and a diagram illustrating its incorporation in a composite drive according to the main patent is illustrated in the drawing accompanying the specification in which FIGURE 1 is a somewhat diagrammatic lay-out of the composite drive, and FIGURE 2 is an axial section of the valve device.

Referring now first to FIGURE 1, a constant-speed output shaft 1, for example an alternator shaft, is driven jointly by an engine 2 and an air motor 3 through a differential gear contained in a gear box 4. One input shaft of the differential gear is coupled to the air motor 10 and another input shaft 5 is coupled to the engine 2 as indicated.

The engine 2, for example a turbo-jet propulsion engine of an aircraft, drives a compressor 6 equipped with a bleed-air tapping 7 which constitutes one source of compressed air for operation of the air motor, while 8 indicates a source of starting pressure supply, for example a small engine-compressor unit, with or without a reservoir, adapted to supply air for starting the engine and if desired for driving the engine auxiliaries for testing purposes on the ground. 9 indicates the change-over valve according to the present invention, which is connected to the starting pressure supply by a line 10 and branched off a common duct 11 which, through non-return valves 12 and 13 respectively, can be supplied alternatively from the bleed-air outlet 7 of the engine compressor or from the starting-pressure supply source 8. The changer-over valve 9 is connected to one side of the air motor 3 by a connection 14 and is also connected to the starting air supply by a line 10 and with an atmospheric vent by a line 15. The function of the change-over valve is to connect the air motor outlet 14 to the atmospheric vent when the valve 9 is in one of its end positions, hereinafter called the normal position, and with the starting-air supply line when the valve 9 is in its other end position, the movement of the valve to one or the other of its end positions being effected by the resulting force produced by the respective action of the pressure in common duct 11, admitted through line 10, and of the engine compressor bleed air pressure admitted through a control line 44, on two opposed piston areas of the change-over valve 9, as will be described in more detail further below with reference to FIGURE 2.

The other side of the air motor 3 is connected by a connection 16 to a control valve 17, which may be constructed similarly to the valve 18, 19 of the main patent and which serves, when the change-over valve 9 is in its normal position in which air motor outlet 14 is connected to the vent 15, to connect the other side 16 of the air motor alternatively with engine-bleed air line 7, or, through branch line 18, with an atmospheric vent 19, according as the engine speed requires to be supplemented by the air motor in order to drive the alternator at the desired constant speed or requires a reduction by allowing the air motor to run in the opposite direction, acting as a pump, in order to reduce the speed at which the alternator is driven by the engine when the engine speed is high. 20 is an emergency trip valve which connects each of two lines 21 and 22, leading respectively to ports 46 and 47 of the valve 9, to an atmospheric vent 23, thereby causing the valve 9 to close the air motor connection 14 and thus arrest the air motor when, due to any defect in the apparatus, the alternator speed or the speed of any other selected element, for example of the air motor, reaches a safety limit. This may occur when, due for example to an obstruction, the device according to the main patent becomes jammed so as to remain in the position in which the air motor assists the engine drive of the alternator although the engine speed is high or, when due for example to premature movement of the valve 9 to normal running position, an excessive speed of the air motor is produced by the control valve 17 in an attempt to raise the alternator speed to normal before the engine has reached the range of its normal working speeds. A restricted air bleed 24, communicating with line 22, normally arrests the movement of the valve 9 in a neutral or blanking position in which the air motor outlet 14 is isolated from both the starting pressure supply line 10 and the vent line 15 when the "starter decoupling" speed is reached, i.e. the speed at which the engine no longer requires external starting power and until the engine has reached its normal range of operating speeds, it being assumed that the trip valve 20 when inoperative, isolates the line 22 from line 21 leading to the piston area tending to move the valve 9 to its starting position.

In FIGURE 2, which represents the valve device 9 of FIGURE 1 in more detail, connections 10, 14, 15, 21 and 22 correspond to those bearing the same numerals in FIGURE 1. It will be appreciated that the connection 15 which, in order to show it in the same plane as the other connections, has been shown as a small atmospheric aperture, may in practice be a flange connection somewhat similar to the connection 10 and arranged at, for example similar to the connection 10 and arranged at, for example 90° thereto so that it would be covered in FIGURE 2 by the representation of the valve housing. The valve housing is shown at 25 and while it will be in practice, and is illustrated as, composed of a number of separate elements, it will hereinafter be referred-to as one element since its various parts do not carry out operative movements in relation to each other. It comprises a fixed sleeve or shell 26, one end of which forms a cylinder co-operating with a piston element 27 of relatively large diameter, while the remainder of the shell 26 forms the stationary part or seat of a cylindrical slide-valve element 28 which is arranged at one side of the piston element 27. This slide-valve element is formed integral with the piston element 27 and has two lands one of which is constituted by a collar portion 29 of the cup-shaped piston element 27 while the other land is indicated at 30. These lands co-operate with ports 31, 32, and 33 in the valve seat 26 in such manner that when the slide valve element 28 when in the illustrated position, connects the ports 31 and 32. Port 32 communicates, through an annulus 34, with motor connection 14, so that the starting-pressure supply line 10 is connected to motor connection 14 for driving the air motor in the direction required for starting the engine or in some cases for running the engine auxiliaries on the ground for testing purposes, while the atmospheric vent 15 is isolated from the supply line 10 and also from the air-motor connection 14. The housing 25 further contains a second fixed sleeve 35 arranged concentrically inside the sleeve 26 at the end opposite to that occupied by the piston 27. This second sleeve 35 forms a cylinder 36 co-operating with a piston 36 which is of smaller diameter than the piston 27. When the force resulting from the bleed-air pressure admitted by line 44 to piston 27 exceeds the force exerted by piston 36 under the common-duct pressure admitted to it from line 10 through a passage 38, the slide valve element 28 is moved to its other end position, in which the collar 29 blanks port 31, and in which annulus 34 of slide valve element 28 establishes communication between ports 32 and 33. The pressure supply line 10 is thus isolated from the motor connection 14 and the latter communicates through ports 32 and 33 and an annular chamber 37 with the atmospheric outlet 15, allowing the air motor to run in the opposite direction when compressed air is supplied via control valve 17 to motor connection 16.

The passage 38 in the housing 25, which interconnects the interior 40 of the cylinder formed by the sleeve 35 with the starting air supply line 10, thus ensuring that a pressure equal to that in the said supply line will normally act upon the piston 36, contains an adjustable restriction 39, and another connection 41, including a restricted aperture 42, leads from the starting-air supply line 10 to the cylinder chamber 43 in which the cup-shaped piston 27 operates, while the connection 44 which, as shown in FIGURE 1, leads from cylinder 33 to compressor-bleed air connection 7, contains a further restricted aperture 45 for reasons which will presently become apparent.

Assuming now that the engine 2 is at a standstill, and that adequate air pressure for starting purposes, for example 35 pounds per square inch, is available from starting-pressure source 8 in supply line 10, the same pressure will also set in cylinder 40 on piston 36 while the pressure in cylinder 43 is low, due to the fact that cylinder 43 is vented through aperture 45 to compressor-bleed line 7, the apertures 42 and 45 being so dimensioned that the force produced by the pressure from line 10 acting on piston 36 in cylinder 40 will exceed the force resulting from the action of the pressure in cylinder 43 upon piston 36 until the engine has reached the so-called starter-decoupling speed, at which the further acceleration of the engine is to be effected solely by internal-combustion pressure without relying on additional power from a starter. When this speed is reached, the increasing pressure in chamber 43 acting on piston 27 overcomes the pressure in cylinder 40 acting on the smaller piston 36 so as to move the slide valve 28 towards the end containing the cylinder 40. This movement will continue until a central position is reached at which the motor connection 14 is isolated both from the starting-pressure supply line 10 and from the atmospheric vent 15, and at which valve 28 uncovering port 46 of connection 22 establishes communication between cylinder 43 and the restricted vent 24. When this is the case, the resultant flow from line 44 through restricted orifice 45 into chamber 43 and out through the partially uncovered port 46 and the restricted vent 24 reduces the pressure in cylinder 43 compared to the bleed-air pressure in line 44, thus preventing further movement of piston 27 until the engine has been further accelerated to the lower limit of its normal operating range, whereupon the pressure in cylinder 43 rises sufficiently, in spite of the bleed through aperture 24, to overcome the pressure in cylinder 40 acting on the relatively small piston area 36, and the slide valve 28 is moved fully to the normal-running position in which the motor connection 14 communicates with the atmospheric vent 15.

If, due to the reaching of a danger limit, the trip governor 20 operates, the lines 21 and 22 are both vented freely to atmosphere at 23. If this takes place during the starting period, in which the slide valve 28 is in the position illustrated in FIGURE 2, cylinder 40 is vented through port 47 leading to line 21, whereupon the pressure acting on the large piston 27 will be able to move the slide valve from the shown starting position towards the normal position but, since line 22 is also vented to atmosphere, the pressure in cylinder 43 is released through port 46 as soon as the slide valve 28 has closed port 31, and before it establishes communication between ports 32 and 33, so that the slide valve 28 will come to rest in the central balancing position. Should the valve slightly overshoot this position, port 47 becomes covered and pressure will build up again in chamber 40, while chamber 43 remains vented, thereby causing the slide valve to return and come to rest in the blanking position in which motor connection 14 is isolated from the starting-pressure supply 10 and from the atmospheric vent 15, thereby preventing the further operation of the air motor 3.

It will be appreciated that similarly if the trip valve 20 comes into operation when the starting valve 9 is in the normal running position, the venting of line 22 will release pressure from chamber 43 until in the central blanking position the valve begins to cover port 46 and port 47 becomes uncovered venting the chamber 40, so that again the slide valve 28 will come to rest in the blanking position in which air motor connection 14 is isolated.

What we claim is:

1. A composite mechanical drive for reducing the speed variations of a driven element as the result of speed variations of an engine providing driving power for the element, including a reversible fluid-pressure motor operatively connected with one leg of a three-leg differential gear drive, the other legs of which are respectively connected with a driving shaft of the engine and with the driven element; control means for the fluid pressure motor operative to control the motor so as to tend to reduce speed variations of the driven element with speed variations of the engine; and a change-over valve so connected to the fluid pressure motor and a starting-pressure supply source that the motor compensates speed variations of the driven element when the valve is in one change-over position for normal running of the engine and that the motor drives the engine for starting up the engine when the valve is in the other change-over position, the change-over valve having actuating means which include two pistons of unequal areas each slidable within a cylinder, the smaller of the two pistons tending under the action of fluid pressure in its cylinder to move the change-over valve to its starting position and the larger piston similarly tending to move the change-over valve to its normal position, and wherein fluid pressure from the starting supply is admitted substantially directly to the smaller cylinder and through a restricted passage to the larger cylinder, a further restricted passage connecting the said larger cylinder to an outlet of a fluid compressor driven by or forming part of the engine.

2. A composite mechanical drive according to claim 1, wherein the change-over valve has a neutral position in which it renders the fluid-pressure motor inoperative with respect to either of its functions, and wherein in moving from its starting to its neutral position the change-over valve opens a restricted atmospheric vent from the larger cylinder of its actuating means.

3. A composite mechanical device according to claim 2, including an overspeed trip device arranged when operated to open an atmospheric vent so controlled by the change-over valve that it communicates with the smaller cylinder of the actuating means when the valve is displaced from its neutral towards its starting position and with the larger cylinder of the actuating means when the valve is displaced from its neutral towards its running position.

4. A composite mechanical drive according to claim 1, wherein the change-over valve and the two pistons of its actuating means form a single unitary assembly slidably mounted within a casing in which are formed the cylinders for the two pistons and the ports for co-operation with the change-over valve.

References Cited in the file of this patent
UNITED STATES PATENTS

| | | |
|---|---|---|
| 2,402,547 | Gilfillan | June 25, 1946 |
| 2,908,189 | Parker | Oct. 13, 1959 |